Feb. 23, 1971    T. E. ALLEN ET AL    3,565,492

AUTOMATIC SAFETY BRAKE SYSTEM

Filed March 20, 1969

INVENTORS
THOMAS E. ALLEN
SHAIRYL I. PEARCE
DONALD L. SMITH

BY

Fryer, Zimmerld, Tiit, Phillips + Lempio

ATTORNEYS 3,565,492
Patented Feb. 23, 1971

3,565,492
AUTOMATIC SAFETY BRAKE SYSTEM
Thomas E. Allen and Shairyl I. Pearce, East Peoria, and Donald L. Smith, Peoria, Ill., assignors to Caterpillar Tractor Co., Peoria, Ill., a corporation of California
Filed Mar. 20, 1969, Ser. No. 808,898
Int. Cl. B60t 8/08
U.S. Cl. 303—21                                      5 Claims

ABSTRACT OF THE DISCLOSURE

A system for preventing a vehicle from traveling at an excessively dangerous rate of speed including a hydraulic circuit triggered by a speed sensing mechanism to actuate an otherwise manual or pedal actuated brake valve.

Excessive speed of some of the very large earthmoving equipment presently in use is exceedingly dangerous because of the size and weight contributing to the inertial masses which come into play if the vehicle goes out of control. Damage to vehicle components also results from overspeeding. Control through engine governors fails to prevent overspeeding during downhill operation and the present invention, through very simple and inexpensive mechanism, meets this need.

A detailed understanding of the invention will be had upon reading the following specification wherein reference is made to the accompanying drawing.

Figure 1:
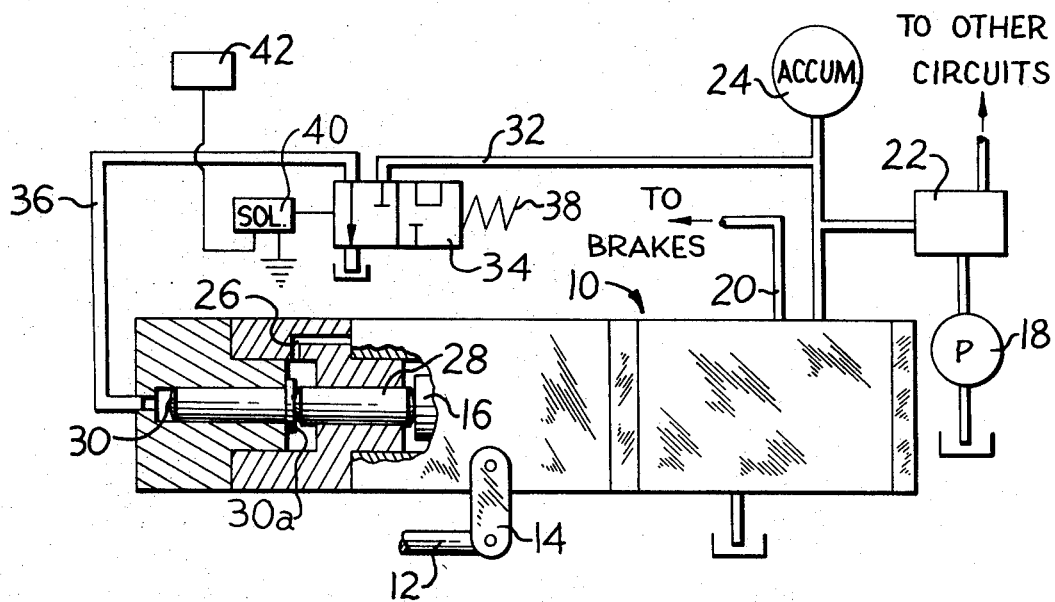
Figure 2:
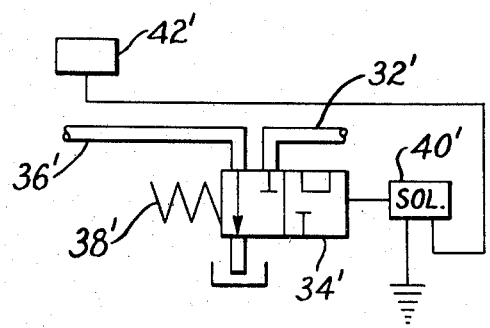

In the drawing, FIG. 1 is a schematic view of the automatic safety brake control of the present invention illustrated in use with a known pedal-actuated brake control valve and FIG. 2 illustrates a modification of certain components of the system shown in FIG. 1.

In FIG. 1 of the drawing, the housing of a pressure-modulated brake valve is generally indicated at 10, this valve being one disclosed in detail in the United States patent to Kenneth R. Lohbauer, No. 3,423,136, which issued to our assignee on Jan. 21, 1969. A detailed disclosure of the valve is not necessary to an understanding of the present invention but the following brief explanation of its operation will suffice. Movement of a pedal-actuated rod 12 and lever 14 causes movement of a valve spool 16 toward the right. This communicates hydraulic pressure from a pump 18 through a line 20 for applying the vehicle brakes. Pressure from the pump also goes to other vehicle circuits, as shown, and through an accumulator charging valve 22 to insure adequate braking pressure through the use of an accumulator 24. While the spool is pedal-actuated, the pressure for moving the spool applied through the pedal is augmented by pressure admitted through a passage 26 to a chamber in which the end of a piston 28 is disposed. Thus, the piston is moved toward the right by hydraulic pressure to aid in rightward movement of the spool, and the force applied to the brakes is modulated by the means shown in the above-mentioned patent, the disclosure of which is not necessary to an understanding of the present invention.

According to the present invention, an auxiliary plunger 30 and appropriate housing therefor are added to the valve 10 and pump pressure is communicated through a line 32, valve 34, and line 36 to move the plunger 30 to the right, and thus the plunger 28 and valve spool 16, for applying the vehicle brakes when the speed of the vehicle exceeds a predetermined maximum.

The valve 34 is normally held in its open position by a spring 38 and is closed, as illustrated, when the vehicle is in motion by a solenoid 40 actuating current to which is provided in response to a speed sensor represented at 42. This speed sensor may be any one of several conventional types, one of which is activated by an amplified DC signal from a conventional frequency converter. The frequency is generated by a magnetic pick-up that senses the rotational speed of some member of the vehicle final drive. When the frequency, and consequently, the DC signal, reach a predetermined level, the speed sensor 42 is activated and sends a signal to the solenoid 40 to de-energize it enabling the spring to open the valve, to initiate the automatic braking action. When braking reduces the speed of the vehicle to a point below the predetermined value, the valve 34 is again closed by the solenoid.

The safety braking provided by the system disclosed is not intended to bring the vehicle to a stop but only to retard its speed. To limit the braking effect, the movement of the plunger 30 may be limited by stop means such as an enlarged end shown at 30a which will engage the end of the valve 10. Braking, to further reduce the speed or to stop the vehicle, may be obtained by conventional pedal actuation which overrides the automatic system disclosed.

The valve 34 may be actuated oppositely to the manner described. That is, as shown in FIG. 2, it may be closed by spring 38' pressure and opened by the solenoid 40'. However, the manner of operation herein disclosed is preferred because it provides a fail safe feature causing application of the brakes in the event of failure of electrical components.

What is claimed is:
1. An automatic safety brake system for a vehicle having brakes which are applied by fluid pressure comprising:
  a source of fluid pressure including a pressure accumulator,
  manually operable fluid flow control means including a spool which when laterally moved permits fluid pressure from said source and accumulator to be applied to said brakes,
  automatic brake actuating means interconnected between said source and accumulator and said manually operable means, said actuating means comprising:
  means sensing said vehicle speed and producing a signal indicative of a vehicle speed which exceeds a predetermined maximum speed,
  an actuator device drivingly related to said spool,
  a valve means responsive to said signal to apply actuating fluid pressure to said actuator device,
  whereby, at a predetermined speed, the sensing means signals the valve which applies fluid pressure to the actuator which laterally drives the spool allowing the fluid pressure from the source and accumulator to drive the vehicle brakes.
2. The system of claim 1 in which the actuator device is a plunger.
3. The system of claim 1 in which the valve means is spring closed and opened by a solenoid adapted to be energized in response to said signal from said speed sensing means.
4. The system of claim 1 in which the valve means is spring opened and closed by a solenoid adapted to be de-energized in response to said signal when vehicle speed exceeds said predetermined value whereby the spring will urge the valve to its open position.

5. The system of claim 2 including means to limit the movement of said plunger to prevent full application of the brakes thereby.

References Cited

UNITED STATES PATENTS

| | | | |
|---|---|---|---|
| 3,423,136 | 1/1969 | Lohbauer | 303—10X |
| 1,557,689 | 10/1925 | Harrigan | 303—21 |
| 2,166,029 | 7/1939 | Vorech | 188—181UX |
| 3,019,060 | 1/1962 | Mallory | 303—21 |
| 2,721,258 | 10/1955 | Freehafer | 246—182 |
| 3,141,707 | 7/1964 | Nigh | 303—21X |
| 3,338,637 | 8/1967 | Harned et al. | 303—21 |
| 3,370,166 | 2/1968 | Rold et al. | 246—182 |

MILTON BUCHLER, Primary Examiner

J. J. McLAUGHLIN, Assistant Examiner

U.S. Cl. X.R.

137—47; 180—108; 181—181; 246—182; 303—13, 40